(No Model.)
F. H. SHAVER.
APPARATUS FOR MEASURING MATTER IN VARIABLE TEST TUBES.
No. 581,472.　　　　　　　　　Patented Apr. 27, 1897.
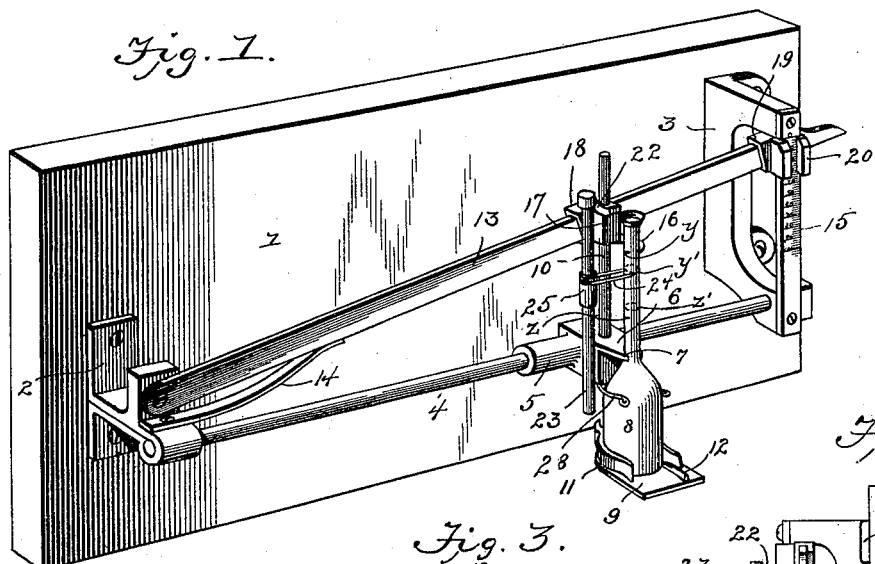
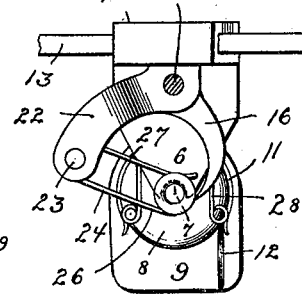
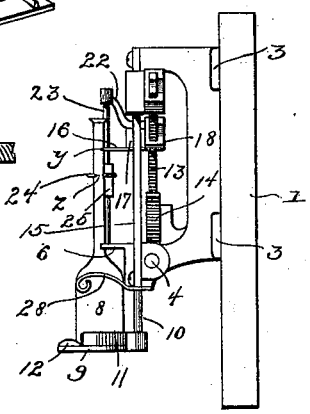
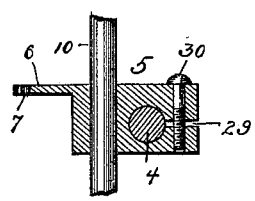
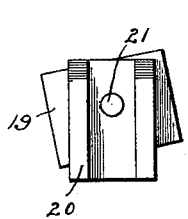
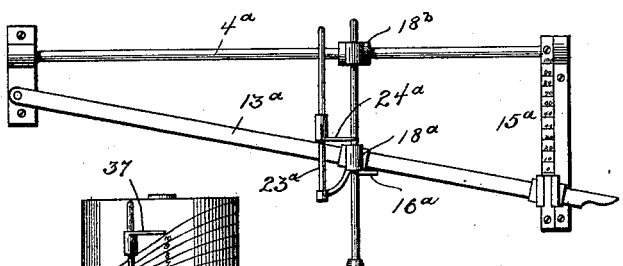
Inventor
Frederick H. Shaver
Witnesses
By his Attorneys,
THE NORRIS PETERS CO., PHOTO-LITHO., WASHINGTON, D. C.

UNITED STATES PATENT OFFICE.

FREDERICK H. SHAVER, OF CEDAR RAPIDS, IOWA.

APPARATUS FOR MEASURING MATTER IN VARIABLE TEST-TUBES.

SPECIFICATION forming part of Letters Patent No. 581,472, dated April 27, 1897.

Application filed July 8, 1895. Serial No. 555,292. (No model.)

*To all whom it may concern:*

Be it known that I, FREDERICK H. SHAVER, a citizen of the United States, residing at Cedar Rapids, in the county of Linn and State of Iowa, have invented certain new and useful Improvements in Apparatus for Measuring Solid Matter in Suspension; and I do hereby declare the following to be a full, clear, and exact description of the invention, such as will enable others skilled in the art to which it appertains to make and use the same.

My invention relates to instruments for measuring the segregated solid matter in liquids, and being more especially applicable to the measurement of separated butter-fat in milk delivered to dairies, creameries, and the like, the object of the invention being to provide simple and accurate means for measuring the percentage of butter-fat in samples of milk, (or measuring other solids held in suspension in liquids,) said means being embodied in an instrument adapted to accomplish with quickness and precision the location of the upper and lower elements of the plug of solid matter and the transference of the measurement of said plug of solid matter to a graduated scale, whereby the volume of solid matter is denoted.

Further objects and advantages of this invention will appear in the following description, and the novel features thereof will be particularly pointed out in the appended claims.

In the drawings, Figure 1 is a perspective view of an apparatus constituting a preferred embodiment of my invention. Fig. 2 is an end view of the same. Fig. 3 is a plan view of the test-tube carrier, calibrator, spacer, and contiguous parts of the mechanism. Fig. 4 is a detail vertical section of a portion of the carrier to show the manner of mounting the same upon the guide-rod. Fig. 5 is a detail view of one of the double slides. Fig. 6 is a front view of a modified form of apparatus embodying my invention. Fig. 7 is still another embodiment of the essential features of the invention.

Similar numerals of reference indicate corresponding parts in all the figures of the drawings.

The invention, while applicable to other uses than the measurement of butter-fat and milk, is especially designed for that specific purpose and hence will be described with relation thereto, the instrument being particularly adapted for use in connection with the process well known in the art as the "Babcock" test, and contemplating the employment of test-tubes or bottles similar to those used in connection with said test. The operations involved in the Babcock test are well known, particularly in so far as they relate to the separation of the butter-fat from the milk, and such separation forms no part of this invention, thus obviating the necessity of any description thereof; but in order that a full understanding of the objects and advantages of my invention may be had it may be stated that for the purpose of measuring the separated butter-fat the Babcock test-tubes are now made in the form of bottles having long cylindrical necks, as uniform in diameter as possible and graduated between two lines on the neck to denote the volume of a unit of measure, as two cubic centimeters of mercury, this graduation being for convenience referred to in the following description as "calibration," and the upper and lower elements of the calibrated portion being referred to as upper and lower "calibration-points." As it is impossible to make the necks of these bottles of the same size the lengths of the graduated portions vary, and owing to this variation the graduation of the tubes becomes a slow and costly operation, thus making the test-tubes expensive.

In order to obtain a direct reading on the graduated scale of a Babcock test-tube, it is necessary to float the separated butter-fat (by pouring in hot water) to raise the same into the neck of the tube and bring the lower end of the plug of fat to the lower calibration-point. In practice it is impossible to accurately arrange the plug of butter-fat as described, and hence it is usual to float the butter-fat to some convenient point midway of the scale, space off its length with dividers, and then apply the dividers to the scale to obtain a reading. To do this, the operator commonly holds the bottle between himself and the light, suspending it by the nozzle, since it is made hot by the water poured into it and by the chemical reaction in the course of separating the butter-fat. To take accurate measurements with the dividers then becomes a delicate and difficult operation, and in general such measurement only approximates accuracy.

It is the object of this invention to obviate these difficulties by enabling an accurate reading to be obtained quickly without the necessity of holding the test-tube during operation, and, furthermore, to provide an apparatus which may be used in connection with test-tubes which are calibrated, but not graduated, the space between the calibration-points being referred, by means of the apparatus, to a scale forming a part of the apparatus.

Referring to the drawings, 1 designates a wall-plate to which are attached brackets 2 and 3 to support a horizontal guide-rod 4. Upon this guide-rod is mounted to slide a carrier 5, having a forward projection 6, provided in its front end with a notch 7 to receive the neck of the bottle or test-tube 8. This carrier is provided with a platform 9, suspended by means of a vertical rod 10, which forms a part of the carrier, said platform being designed to support the test-tube and being fitted at its upper side with a stirrup-shaped retaining-spring 11 and a rib 12, designed to tilt the bottle or test-tube laterally in withdrawing it from its position upon the platform, for a purpose hereinafter explained.

The platform occupies a fixed position with relation to the carrier, and hence with relation to the path of the carrier, which is regulated by the guide-rod 4, and at a definite arbitrary distance above the plane of the platform, or at a fixed distance from the bottom of the tube, is formed on the latter a mark $z$, constituting the lower calibration-point. This lower calibration-point is formed at the said definite distance from the bottom of the test-tube irrespective of the cross-sectional area or diameter of the neck of said test-tube, and in calibrating the neck of the tube this lower mark is first formed by scratching the glass, after which the position of the upper calibration-point is obtained by placing two cubic centimeters of mercury in the tube, placing a movable plug or stopper in the mouth of the tube, inverting the tube to arrange the mercury in the neck, and finally adjusting the plug or stopper to bring the upper limit of the contained mercury to the level of the calibration-point $z$ which was previously formed. When this adjustment has been obtained, the lower limit of the plug of mercury indicates the location of the upper calibration-point, which is in turn indicated upon the neck of the bottle by means of a scratch, (represented at $y$.) The upper calibration-point is the only one used in the subsequent operations of testing milk, and hence is the only point which it is necessary to indicate upon the neck of the bottle with distinctness. The lower calibration-point is necessary merely as a starting-point for the calibration. The lower limit of the calibrated portion of the neck must be at a given uniform distance from the bottom of the tube, and hence from the plane of the platform when the tube is arranged thereon. Pivotally mounted upon the bracket 2, contiguous to the plane of the guide-rod, is a swinging bar 13, normally held in its elevated position by means of a spring 14, and operating at its free end contiguous to a vertical scale-bar 15, and mounted upon the carrier, as upon the vertical rod 10, is a calibrator 16, consisting of a pointer which terminates at such a point as to be contiguous to the neck of a test-tube supported by the carrier and in position to be arranged in the plane of the upper calibration-point upon the test-tube. Obviously this calibrator is capable of vertical adjustment upon the carrier, and hence in a plane perpendicular to the path of the carrier, by reason of the vertical rod 10, and is also capable of lateral movement with the carrier. This calibrator is also designed to be operated by means of the swinging bar 13, and hence has a sliding connection therewith, whereby as the carrier is moved upon the guide-rod 4 the calibrator is moved toward or from the plane of the platform 9 by reason of the normal inclined position of the swinging bar 13. Various forms of connections between the calibrator and the swinging bar may be employed—such, for instance, as a double or compound slide, of which one member 17 carries the calibrating-pointer 16 and is mounted to slide upon the vertical rod 10, while the other member 18 is mounted to slide upon the swinging bar 13, said members being pivotally connected in a manner similar to that illustrated in Fig. 5, and which shows a double or compound slide consisting of members 19 and 20, respectively fitted upon the scale-bar 15 and the swinging bar 13 and pivotally connected, as at 21. It will be seen that the double slide 17 18 allows movement of the carrier, and hence lateral movement of the calibrator, independent of the swinging bar, and at the same time allows the swinging bar to communicate vertical movement to the calibrator. In the same way the double or compound slide 19 20 allows the swinging bar to slide through the member 19 as its free end is depressed, while the member 20 follows the direction of the scale-bar 15, the beveled upper extremity of the member 20 serving as a pointer to indicate the desired graduation of the scale-bar, as hereinafter fully explained.

Depending from the arm 22 on the calibrator is a vertical rod 23, which moves with the calibrator and essentially forms a part thereof, and mounted for vertical movement upon this rod is a spacer 24, of which the hub 25 is split or slotted to have frictional contact with the rod and bear thereon with sufficient force to hold the spacer at any desired adjustment without interfering with the easy movement thereof in the operation of the apparatus. The spacer preferably consists of front and rear pointers or legs 26 and 27, the pointed forward leg of which serves to indicate the upper line of the plug of butter-fat in the test-tube, while the other or rear leg 27 by contact with the opposite or rear side of the test-tube controls the lateral movement of the front pointer or leg and thus holds the latter in close proximity to the surface of the test-tube. The back pointer or leg is preferably made longer than the forward one, whereby in placing the test-tube in position it first strikes the back leg and then draws the spacer rearwardly by swinging it upon the rod 23 to arrange the parts as indicated in Fig. 3. In withdrawing the test-tube from the apparatus the tilting-rib 12 inclines the same slightly to the left and thereby has the effect of swinging the spacer into a convenient position for the insertion of the next bottle, whereby as the succeeding bottle is put in place the neck thereof passes the front pointer or leg and strikes the rear pointer, as above indicated. To hold the bottle firmly in position when upon the platform, I employ a retaining-spring 28, which engages the bottle contiguous to its shoulder at opposite sides.

The portion of the carrier which fits upon the guide-rod 4 is preferably slotted, as shown at 29, and is provided with a set-screw 30 whereby the frictional contact with said rod may be varied to secure the required facility of operation without allowing accidental displacement.

The operation of the instrument is as follows: The test-tube to be used having been calibrated, as hereinbefore described, and having been supplied with a sample of milk, (treated in accordance with an approved method of separating the butter-fat,) is placed on the platform, where it is held firmly in position by the joint action of the springs and coöperating means above mentioned. The butter-fat having been floated into the neck of the bottle by pouring in hot water may be supposed to occupy a position indicated by the upper and lower lines $y'$ and $z'$, which, however, are not in the planes of the calibration-points $y$ and $z$, marked on the neck of the bottle. The bottle-carrier, which may be at any point upon the rod 4, is then moved until the calibrator 16 is accurately in the plane of the upper calibration-point, as shown in Fig. 1, after which the spacer 24 is moved vertically upon the calibrator to a position accurately in the plane of the upper limit of the plug of butter-fat, as indicated in Fig. 1. The swinging bar 13 is then depressed until the spacer reaches the plane of the lower end of the plug of butter-fat, when the upper end of the slide on the scale-bar will indicate the exact volume of butter-fat contained in the neck of the receptacle.

It will be seen that the underlying principle upon which the invention is based is that the base and altitude of a right-angle triangle are exactly proportional to the base and altitudes, respectively, of a projected right-angle triangle, the length of the calibrated portion of the test-tube forming the base of one triangle, while the base of the extended triangle is found upon the scale-bar, and as said bases are exactly proportional to the altitudes it is obvious that the length of the calibrated portion of the neck, irrespective of its measurement, may be referred to or projected upon the scale-bar, and thereby reduced to a scale-indicating volume.

The principle involved in the above-described apparatus may be embodied in various other analogous forms of devices. For instance, the construction shown in Fig. 1 may be inverted to produce an apparatus shown in Fig. 6, in which case the platform $9^a$ is secured to the member $18^a$ of the double slide and fits to slide in a guide $18^b$ on the guide-rod $4^a$. The scale-bar $15^a$ is also reversed, since the test-tube is elevated instead of being depressed to obtain the reading, gravity being depended upon instead of a spring to hold the swinging bar 13 in its normal position, and other portions of the apparatus, including a calibrator $16^a$, rod $23^a$, and spacer $24^a$, are similar to those hereinbefore described. A still simpler application of the same principle is shown in Fig. 7. In this case differential triangles are represented by divergent lines on the surface of a cylinder, starting from a point at or near the base thereof. This cylinder is adapted to turn in a horizontal plane on an axis 31, to which the platform 32 is attached or of which it forms a part. This axis slides vertically, but does not turn, on a stem 33 rising from the base 34. To the base is also connected a pointer 35 to give the reading by coincidence with the lines on the cylinder. A spring 36 supports the platform and cylinder. The bottle or test-tube being set in position on the platform, the cylinder is turned until the upper line of the cylinder intersects the line of calibration. The upper line of the butter-fat is then found by means of the spacer 37, when the cylinder is depressed until the spacer marks the lower limit of the butter-fat, the proper reading being indicated by the pointer 35.

It is to be understood that it is not absolutely essential that the spacer should be adjustable, since the reading can be obtained if such pointer is fixed upon and adjustable only with the calibrator or is dispensed with entirely. In this case, however, it would be impossible to always start at zero to read the scale, and to obtain the reading would involve the subtraction of one member of the scale (the starting-point) from another, which would indicate the stopping-point. It is preferable, therefore, that the spacer be adjustable, so that on the movement of the calibrator or of the test-tube with relation to the calibrator the reading may be taken directly from the scale.

From the foregoing it will be understood that the calibrator is that point which is employed, in connection with the calibration of the test-tube, to secure the proper adjustment of the test-tube with reference to the scale, the normal position of this calibrator with relation to the platform of the carrier being dependent upon the distance of the carrier from the scale. Hence the term "calibrator" must be distinguished from the term "calibration," which is used in connection with the test-tubes to indicate that operation completed before applying the test-tubes to the instrument for indicating a portion of the neck of the test-tube having a definite capacity measured by a unit of volume. The spacer, on the other hand, is that pointer which, while it is carried by the calibrator, is adjustable independently thereof and is adapted to be adjusted to agree with the upper limit of the butter-fat in the tube or space off the depth of the stratum of butter-fat or other matter and compensate for any interval which may exist between the upper calibration-point and the upper limit of the contained butter-fat.

Various changes in the form, proportion, and the minor details of construction may be resorted to without departing from the spirit or sacrificing any of the advantages of this invention.

Having described my invention, what I claim is—

1. In an instrument of the class described, the combination of a test-tube carrier mounted for movement in a straight line, a swinging bar normally arranged at an inclination to the path of the carrier and mounted for movement toward and from the same, means for indicating the angular movement of the swinging bar, and a spacer carried by the swinging bar for movement perpendicular to the path of the test-tube carrier, and also mounted for movement parallel with the bar, said spacer being also capable of movement independently of the bar in a direction perpendicular to the path of the carrier, substantially as specified.

2. In an instrument of the class described, the combination of a test-tube carrier mounted for movement in a straight line, a swinging bar normally arranged at an inclination to the path of the carrier, means for indicating the angular movement of the swinging bar, a calibrator mounted for movement parallel with the swinging bar and perpendicular to the path of the carrier, and a spacer mounted for simultaneous movement coextensive with the calibrator and capable of perpendicular movement independently of the same, substantially as specified.

3. In an instrument for measuring butter-fat or the like in calibrated test-tubes having their lower calibration-point at a given fixed distance from the bottom of the tube, and the upper calibration-point being regulated by the capacity of the portion of the tube between the calibration-points, measured by a unit of volume, the combination of a horizontally-movable test-tube carrier having a supporting-platform for test-tubes, a pivoted bar normally inclined to the path of the carrier, a calibrator mounted on the carrier for independent vertical movement and connected to said bar, an independently-adjustable spacer mounted for movement on the calibrator, and a scale to register the movement of the inclined bar, substantially as specified.

4. In an instrument for measuring butter-fat or the like, the combination of a test-tube carrier, a horizontal support upon which the carrier is mounted for adjustment, a pivoted bar having a normal inclination to the carrier-support, a calibrator mounted to move vertically with respect to the carrier and longitudinally with respect to the bar as the bar is moved toward or from the support, an adjustable spacer mounted upon the calibrator for movement with said bar, and capable of independent movement perpendicular to the said support, and a vertical scale to register the movement of the bar, substantially as specified.

5. In an instrument for measuring butter-fat or the like, the combination of a horizontally-adjustable test-tube carrier, a pivoted bar normally inclined to the path of the carrier, a compound slide connecting the carrier and the bar, a calibrating-pointer carried by said slide, a vertically-adjustable spacer also carried thereby, and a graduated scale near the free end of the bar, substantially as specified.

6. In an instrument of the class specified, the combination with a test-tube carrier, of a spacer having a vertically-adjustable tension-hub and spaced legs, one leg thereof being longer than the other, and adapted to bring the other pointed leg into juxtaposition with the opposite side of the tube, as specified.

7. In an instrument of the class described, the combination of the rotatable bifurcated spacer, the carrier and its connected platform having suitable retaining spring or springs, and a tilting-rib near one side, adapted to tilt the bottle laterally when withdrawn, and thus swing the spacer to a convenient position for the placing of the next bottle, as specified.

In testimony whereof I affix my signature in presence of two witnesses.

FREDERICK H. SHAVER.

Witnesses:
L. A. ST. JOHN,
J. M. ST. JOHN.